United States Patent
Robbins et al.

[11] Patent Number: 5,558,002
[45] Date of Patent: Sep. 24, 1996

[54] HYDRAULIC BOOSTERS FOR VEHICLE HYDRAULIC SYSTEMS

[75] Inventors: Keith J. Robbins, West Yorkshire, England; Michael Williamson, Caerleon, United Kingdom; Andrew R. Broadwell, Humberside, England

[73] Assignee: Lucas Industries, Public Limited Company, Solihull, England

[21] Appl. No.: 393,270

[22] Filed: Feb. 23, 1995

[30] Foreign Application Priority Data

Feb. 26, 1994 [GB] United Kingdom ............... 9403764

[51] Int. Cl.⁶ ..................................................... F15B 9/10
[52] U.S. Cl. ........................................... 91/378; 91/376 R
[58] Field of Search ................................. 91/376 R, 378

[56] References Cited

U.S. PATENT DOCUMENTS 4,359,869  11/1982  Ideta ........................... 91/376 R
4,379,423   4/1983  Leineweber et al. .

FOREIGN PATENT DOCUMENTS

0460724A1  5/1991  European Pat. Off. .
2602050    1/1976  Germany .
2097499    4/1982  United Kingdom .

Primary Examiner—F. Daniel Lopez
Attorney, Agent, or Firm—Oldham & Oldham Co., LPA

[57] ABSTRACT

A control valve for controlling the pressurisation of a power chamber of the booster comprises a spool working in a bore in a boost piston. The spool carries longitudinal spaced radial seals, a first one of the seals being disposed so as to prevent fluid from a radial high pressure supply port entering the power chamber through the spool at least when the booster is in an inoperative position. Movement of the spool in a forward operating direction, in response to an input force, causes the first one of the seals to uncover the port so that fluid can enter the power chamber through the spool. The other seal is adapted to uncover a radial return port connected to a reservoir when the input force is released.

12 Claims, 2 Drawing Sheets

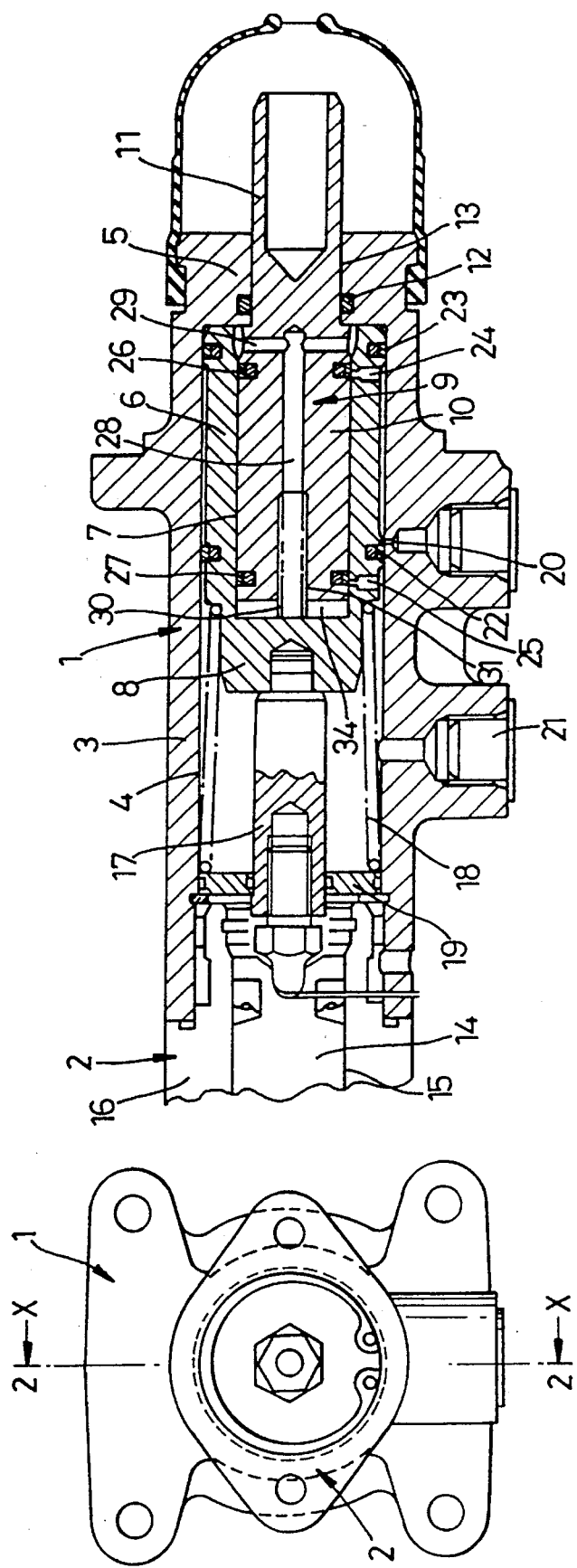

HYDRAULIC BOOSTERS FOR VEHICLE HYDRAULIC SYSTEMS

BACKGROUND OF THE INVENTION

This invention relates to hydraulic boosters for vehicle hydraulic systems, especially braking systems, of the kind in which a boost piston working in a bore in a body is adapted to apply an output force to an output member, for example for operating an hydraulic master cylinder, in response to a pressure applied to a power chamber under the control of a control valve, in turn responsive to an input force. Hydraulic boosters of this kind are hereinafter referred to as hydraulic boosters "of the kind set forth".

In hydraulic boosters of the kind set forth difficulties are often experienced in maintaining concentricity between components in order to ensure that seals provided between adjacent chambers are effective, particularly when the booster is of the closed-center type and is disposed in a retracted "inoperative" position.

When the booster is of the closed-center type in which fluid is metered across an orifice by operation of the control valve, a constant flow of fluid is required during operation. This can be a drain on the supply, particularly during a long operating cycle, thereby making it unsuitable for some occasions.

SUMMARY OF THE INVENTION

According to our invention in an hydraulic booster of the kind set forth, the control valve comprises a spool working in a bore in the boost piston with the spool carrying a pair of longitudinally spaced radial seals, a first one of the seals being disposed so as to prevent fluid from a radial high pressure supply port in a wall of the boost piston from entering the power chamber through the spool at least when the booster is in an inoperative position, movement of the spool in a forward operating direction causing the first one of the seals to uncover the port so that fluid enters the power chamber through the spool, in turn to advance the boost piston in its bore.

A first one of the seals may substantially cover the supply port at least when the booster is in the inoperative condition. Alternatively, the first one of the seals may partially cover the supply port at least when the booster is in the inoperative condition. Preferably, where the first seal partially covers the port, the first seal extends rearwardly of the port and the second seal is disposed forwardly of the port.

Conveniently the second seal also uncovers a radial return port in the boost piston when the input force is relieved. This ensures that the fluid is only used from a supply connected to the high pressure port when movement of the boost piston is required and during operation no constant flow of fluid from the supply to a reservoir connected to the return port takes place. The boost pressure is therefore regulated by restricting flow.

The spool valve ensures that the fluid is only taken from the supply when movement is required to generate an output force, conveniently to operate a master cylinder. Also fluid is only relieved to the reservoir when the input force is relieved.

Preferably each of the spaced seals carried by the spool comprises, in combination, a seal of PTFE backed by an elastomeric seal. Such combination seals are relatively cheap and provide an effective sealing system, able to compensate for tolerance variations.

A stopping means may be provided for restricting movement of the spool in a rearward direction. Preferably, the stopping means is carried by the boost piston.

When the input force is relieved, the spool may move rearwardly. The stopping means preferably engages with a portion of the spool when the first one of the seals is disposed so as to partially cover the supply port while extending rearwardly of the port. The stopping means preferably prevents further rearward movement of the spool which would cause the two seals to be disposed on opposite sides of the supply port and thus enable pressurised fluid from the port to enter freely a region of the bore located between the two seals, and become trapped therein. Such trapped pressurised fluid tends to "energise" the first and second seals (due to fluid expansion) and thus cause increased input force to be required in order to move the spool in the forward operating direction. This would, in turn, be felt by an operator, for example the vehicle driver, supplying the input force, for example using a brake pedal.

Where the first one of the seals partially covers the supply port, such that it extends rearwardly of the port, a small amount of fluid may still enter the region of the bore between the two seals. However, the fluid flow into this region from the port is substantially reduced with respect to the fluid flow when the supply port is located wholly between the two seals, and thus the energising effect on the seals is substantially reduced. The stopping means thus provides improved "pedal feel" for the operator.

Alternatively, the first one of the seals may substantially cover the supply port when the portion of the spool engages with the stopping means. In this position, however, the pressurised fluid from the supply port may press against the PTFE seal so as to compress the elastomeric seal. This, in turn, may allow a small amount of fluid to flow from the port into the region of the bore between the two seals. Again, such fluid flow is substantially less than the free fluid flow into the region of the bore between the seals which would take place if the port were located wholly between the two seals and thus the stopping means still provides improved pedal feel.

Where the stopping means is provided, the radial inlet and outlet ports may be located on opposite sides of the second one of the seals at least when the stopping means engages with the portion of the spool.

A forward end of the spool may be provided with a recess. The recess preferably enables fluid communication to be maintained between the boost piston and that end of the spool when an input force is applied which is greater than the force of pressurised fluid against the boost piston. When such a force is applied, the spool is advanced forwardly until it comes into contact with the boost piston itself. The recess preferably enables fluid to flow relatively easily when the input force is relieved and the spool and the piston move apart. This again provides improved pedal feel for an operator, compared to the operation of such a system if no recess were provided in the end of the spool.

The recess may comprise a slot in the end of the spool. Alternatively, the recess may comprise a counterbore in the end of the spool.

BRIEF DESCRIPTION OF THE DRAWINGS

Embodiments of our invention are illustrated in the accompanying drawings in which;

FIG. 1 is an end view of a combined hydraulic booster and master cylinder assembly;

FIG. 2 is a longitudinal section through the assembly substantially on the line 2—2 of FIG. 1;

FIG. 3 is a view on an enlarged scale of a combination seal used in the control valve;

DETAILED DESCRIPTION OF THE PREFERRED EMBODIMENTS

Figure 4:
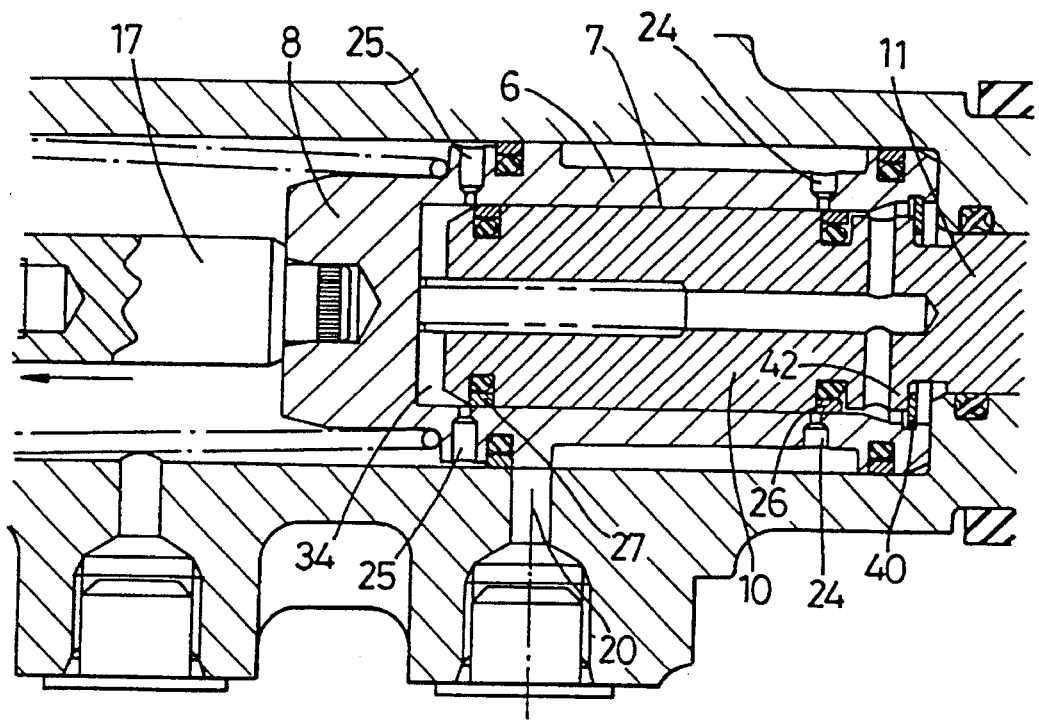
FIG. 4 is a longitudinal section through an improved combined hydraulic booster and master cylinder assembly.

The combined booster and master cylinder assembly illustrated in FIGS. 1 to 3 of the drawings comprises a booster 1 and a master cylinder 2. The booster 1 comprises a body 3 having a longitudinally extending bore. The bore is open at one end to receive the adjacent end of the master cylinder 2, and is closed at the opposite end by means of an end wall 5.

A boost piston 6 works in the bore 4. The boost piston has a longitudinally extending internal bore 7 which is closed at its inner end by an end wall 8. A control valve 9 is housed in the booster 1. The control valve 9 comprises a spool 10 working in the bore 7 and carried by a rod portion 11 of reduced diameter and which is slidably guided through a seal 12 housed in a wall of an opening 13 in the end wall 5 and through which the rod portion 11 projects for co-operation with an input member, suitably a pedal operated rod (not shown).

The master cylinder 2 comprises a piston 14 working in a bore 15 in a body 16 and an output member 17 projecting forwardly from the end wall 8 acts on the adjacent end of the piston 14 to transmit an output force to it. Normally the piston 14 of the master cylinder is held in the retracted position by means of return springs (not shown), and the boost piston 6 is held in the retracted position defined by co-operation with the end wall 5 by means of a return spring 18 acting against an abutment plate 19 through which the output member 17 is guided to slide in a sealing manner.

The body 3 of the booster is provided with axially spaced input and output ports 20 and 21 of which the port 20 is connected to a supply of high pressure fluid, suitably a pump or hydraulic accumulator, and the output port 21 is connected to a reservoir for fluid. The input port 20 is disposed between axially spaced radial seals 22 and 23 carried by the boost piston 6, and the output port communicates with a chamber defined in the body 3 between the boost piston 6 and the abutment plate 19.

A radial inlet port 24 and a radial outlet port 25 are both provided in the wall of the boost piston 6 with each port being covered by a respective one of a pair of axially spaced radial seals 26,27 carried by the spool at least when the spool is in an inoperative retracted position. In such a position a longitudinal passage extending through the spool 10 and open at its inner end is isolated from the inlet port 24 through communicating radial passages 29. The spool 10 is held in this retracted position by means of a return spring 30 housed in an enlarged portion 31 at the inner end of the longitudinal passage 28.

Each of the seals 22,23,26 and 27 comprises a combination of a PTFE seal 32 backed by an elastomeric seal 33. Each combination seal provides an effective sealing system able to compensate for any tolerance variations due to lack of concentricity between the bore 4 of the body 3, the boost piston 6, and spool 10, and the bore 13.

In the inoperative retracted position the seal 27 closes the outlet port 25, thereby isolating the inner end of the bore 7, which defines a boost chamber 34, from the reservoir. In operation, a force applied to the rod portion 11 advances the spool 10 in the bore 7, placing the high pressure inlet port in communication with the boost chamber 34 through the inlet port 24, the radial passages 29, and the longitudinal passage 28. The boost chamber 34 is therefore pressurised with high pressure fluid which, in turn, causes the boost piston 6 to advance in the bore 4 and apply an operating force to the master cylinder 2 through the output member 17.

In operation fluid is only drawn from the high pressure supply when movement of the boost piston 6 is required.

At an equilibrium position, when the spool 10 stops advancing in the bore 7, the seals 26, 27 are again covering a respective one of the radial ports 24, 25, with seal 26 preventing any further fluid entering the chamber 34.

When the pedal is released the seal 27 uncovers the outlet port 25 with the boost chamber 34 being relieved to the reservoir through the outlet port 25 and the output port 21, (since the seal 27 acts to isolate the high pressure inlet port 24 from the outlet port 25).

The boost piston 6 returns to its retracted position and the spool 10 returns to its inoperative position in which the seal 26 covers the inlet port 24.

It follows that during an operating cycle, a constant flow of fluid from the high pressure supply to the reservoir takes place since the pressure in the boost chamber 34 is regulated by the flow being restricted by the seals 24,25.

The control valve 9, including the spool 10, ensures that the fluid is only taken from the high pressure supply when movement is required to operate the piston 14 of the master cylinder 2. In addition fluid is only allowed to return to the reservoir when the master cylinder and the pedal are released.

In an improved embodiment, shown in FIG. 4, the boost piston 6 carries a circlip 40 which restricts rearward movement of the spool 10. The circlip engages with a portion 42 of the spool 10 when the seal 26 is disposed so as to partially cover, and extend rearwardly of, the radial inlet port 24. When the pedal is released (after application of force to the rod portion 11 has taken place), the circlip prevents the spool 10 moving sufficiently rearwardly with respect to the boost piston 6 for the inlet port 24 to be located entirely between the seals 26, 27. The circlip thus ensures that relative movement between the boost piston and the spool stops once the seal 26 partially covers, and extends rearwardly of, the inlet port 24. This restricts the flow of pressurised fluid into the region of the bore located between the seals 26, 27.

In the improved embodiment of FIG. 4, with the portion 42 of the spool engaged with the circlip 40, the radial outlet port 25 is disposed forwardly of the seal 27 such that the chamber 34 is in communication with the reservoir. In operation, a force applied to the rod portion 11 advances the spool 10 in the bore 7 to cause the seal 27 to close the outlet port 25, thereby isolating the chamber 34 from the reservoir. When the pedal is released, the seal 27 uncovers the outlet port and the chamber is relieved to the reservoir.

Figure 5:
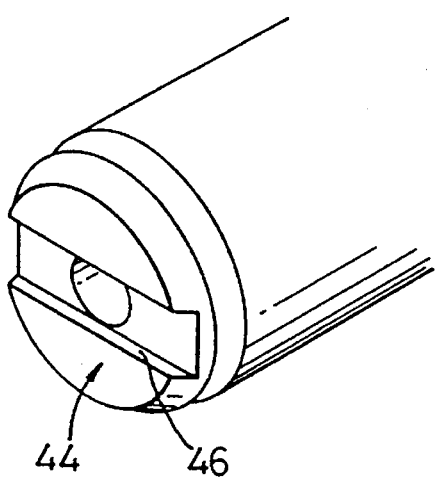
FIG. 5 is a perspective view of a forward end of a spool incorporated in the control valve in the assembly shown in FIG. 4.
Figure 6:
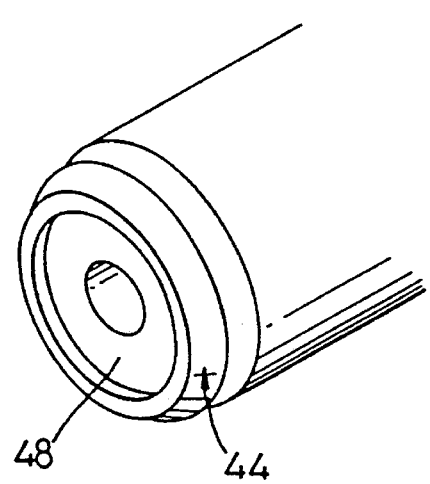
FIG. 6 is a perspective view of a forward end of an alternative spool.

In the embodiment of FIG. 4, the spool 10 is provided at its forward end 44 with a slot 46 as shown in FIG. 5. In an alternative embodiment the end 44 of the spool is provided with a counterbore 48, as shown in FIG. 6. The slot 46, or counterbore 48, enables fluid communication to be maintained between the end 44 of the spool and the end wall 8 of the boost piston, when the spool 10 is advanced in a forward direction to the extent that the end 44 of the spool comes into contact with the end wall 8 of the boost piston. This will be the case where the force applied to the rod portion 11 is greater than the "boost" force provided by the pressurised fluid on the piston. The slot or counterbore enables fluid to flow more easily upon release of the pedal when the spool and piston move apart than if no such slot or counterbore were provided.

I claim:

1. An hydraulic booster for a vehicle hydraulic systems comprising:
   a body including a bore;
   a boost piston located in the bore, the boost piston comprising a bore and a wall in which a radial high pressure supply inlet port and a radial return outlet port are (is) provided;
   an output member in communication with the boost piston;
   a power chamber located in the bore of the boost piston, and
   a control valve in communication with the power chamber, wherein
   the boost piston is operable to apply an output force to the output member in response to a pressure applied to the power chamber under (the) control of the control valve, in turn responsive to an input force, and
   the control valve comprises a spool in working communication with the bore of the boost piston, and a pair of longitudinally spaced radial seals carried by the spool, a (the) first one of the seals being disposed so as to prevent fluid from the radial high pressure supply port from entering the power chamber through the spool at least when the booster is in an inoperative position, movement of the spool in a forward operating direction causing the first one of the seals to uncover the supply port so that fluid enters the power chamber through the spool, in turn to advance the boost piston in its bore, and a second one of the seals is disposed so as to prevent fluid from leaving the power chamber at least when the booster is in the operative condition, and uncovers the radial return port when the input force is relieved.

2. An hydraulic booster according to claim 1, wherein the first one of the seals substantially covers the supply port at least when the booster is in the inoperative position.

3. An hydraulic booster according to claim 1, wherein the first one of the seals partially covers the supply port at least when the booster is in the inoperative position.

4. An hydraulic booster according to claim 3, wherein the first one of the seals extends rearwardly of the supply port and the second one of the seals is disposed forwardly of the port, at least when the booster is in the inoperative position.

5. An hydraulic booster according to claim 1, wherein each of the spaced seals comprises a seal of PTFE (polytetra fluro-ethylene) backed by an elastomeric seal.

6. An hydraulic booster according to claim 1, further comprising stopping means for restricting movement of the spool in a rearward direction.

7. An hydraulic booster according to claim 6, wherein the stopping means is carried by the boost piston.

8. An hydraulic booster according to claim 7, wherein the stopping means engages with a portion of the spool when the first one of the seals is disposed so as to partially cover, and extend rearwardly of, the supply port.

9. An hydraulic booster according to claim 8, wherein (the radial inlet and outlet ports) said radial high pressure supply inlet port and said radial return outlet port are located on opposite sides of the second one of the seals at least when the stopping means engages with the portion of the spool.

10. An hydraulic booster according to claim 1, wherein the spool comprises a forward end which is provided with a recess.

11. An hydraulic booster according to claim 10, wherein the recess comprises a slot.

12. An hydraulic booster according to claim 10, wherein the recess comprises a counterbore.

* * * * *